United States Patent
Haravu et al.

(10) Patent No.: US 11,513,716 B2
(45) Date of Patent: Nov. 29, 2022

(54) WRITE FIRST TO WINNER IN A METRO CLUSTER

(71) Applicant: EMC IP Holding Company LLC, Hopkinton, MA (US)

(72) Inventors: Nagasimha Haravu, Apex, NC (US); Alan L. Taylor, Cary, NC (US); David Meiri, Somerville, MA (US); Dmitry Nikolayevich Tylik, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 17/155,367

(22) Filed: Jan. 22, 2021

(65) Prior Publication Data
US 2022/0236877 A1    Jul. 28, 2022

(51) Int. Cl.
*G06F 3/06*     (2006.01)
*G06F 12/0882*  (2016.01)

(52) U.S. Cl.
CPC ............ *G06F 3/065* (2013.01); *G06F 3/0619* (2013.01); *G06F 3/0635* (2013.01); *G06F 3/0638* (2013.01); *G06F 3/0689* (2013.01); *G06F 12/0882* (2013.01)

(58) Field of Classification Search
None
See application file for complete search history.

(56) References Cited

U.S. PATENT DOCUMENTS

| | | | | |
|---|---|---|---|---|
| 6,493,796 B1* | 12/2002 | Arnon | ................ | G06F 11/2071 710/22 |
| 6,721,901 B1* | 4/2004 | McBrearty | .......... | G06F 11/2082 714/6.1 |
| 9,378,219 B1 | 6/2016 | Bono et al. | | |
| 9,430,480 B1 | 8/2016 | Bono | | |
| 9,454,326 B1 | 9/2016 | Bono et al. | | |
| 9,933,947 B1* | 4/2018 | Vokaliga | ............... | G06F 3/0683 |
| 10,148,751 B1* | 12/2018 | Natanzon | .............. | G06F 11/202 |
| 10,200,304 B1* | 2/2019 | Vokaliga | ............... | H04L 47/827 |
| 10,719,257 B1* | 7/2020 | Meiri | ..................... | G06F 3/0674 |
| 2003/0188233 A1* | 10/2003 | Lubbers | .............. | G06F 11/2069 714/100 |
| 2007/0226320 A1* | 9/2007 | Hager | .................. | G06F 16/182 709/219 |
| 2013/0347079 A1* | 12/2013 | Gladwin | ............. | G06F 11/1076 726/4 |
| 2017/0091299 A1* | 3/2017 | Ngan | .................. | G06F 11/2076 |
| 2020/0250051 A1* | 8/2020 | Chen | ....................... | G06F 3/067 |
| 2020/0250133 A1* | 8/2020 | Bono | ..................... | G06F 16/13 |

* cited by examiner

*Primary Examiner* — Yaima Rigol
(74) *Attorney, Agent, or Firm* — BainwoodHuang

(57) ABSTRACT

A technique for maintaining synchronization between two arrays includes assigning one array to be a preferred array and the other array to be a non-preferred array. When write requests are received at the preferred array, the writes are applied locally first and then applied remotely. However, when write requests are received at the non-preferred array, such writes are applied remotely first and then applied locally. Thus, writes are applied first on the preferred array and then on the non-preferred array, regardless of whether the writes are initially received at the preferred array or the non-preferred array.

20 Claims, 5 Drawing Sheets

WRITE FIRST TO WINNER IN A METRO CLUSTER

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems, also called "arrays," arrange their data in metro clusters. "Metro clusters" are storage deployments in which two volumes hosted from respective arrays are synchronized and made to appear as a single volume to application hosts. Such volumes are sometimes referred to as "stretched" because they appear to extend between two arrays. Arrays participating in metro clusters can typically be separated by up to 100 km. Primary use cases for metro clusters include increased data availability, disaster avoidance, resource balancing across datacenters, and storage migration.

To ensure consistency between both sides of a stretched volume as write requests of data are received, arrays participating in a metro cluster may enforce a policy that defines which array writes the data first. In some arrangements, the array that receives the write request writes the data first locally and then replicates the data to the other array, where the data is written remotely. In other arrangements, the array that receives the write request forwards the data to the other array, which writes the data remotely first. Once the data are successfully written at the remote array, the local array that received the write request writes the data locally. In still other arrangements, the array that receives the data directs a simultaneous write of the data both locally and remotely.

SUMMARY

Unfortunately, each of these policies involves deficiencies, as the possibility exists that failures can cause the two arrays to get out of sync, such that the data on one array does not match the corresponding data on the other array. This scenario can lead to data corruption, which is not always recoverable. Also, prior approaches can cause deadlocks to occur, where each array is waiting for a lock to be released by the other.

Remedial measures have been proposed for addressing these deficiencies. For example, storage systems may dedicate large amounts of non-volatile memory for maintaining state information on each array, which can enable later recovery in the event that an out-of-sync conditions arises. Such solutions tend to be costly, however. Deadlocks may be resolved by applying timeouts that end the deadlocks, but timeouts slow system performance and can fail to resolve underlying errors. What is needed, therefore, is a more effective way of ensuring consistency between arrays.

This need is addressed at least in part by an improved technique for maintaining synchronization between two arrays. The technique includes assigning one array to be a preferred array and the other array to be a non-preferred array. When write requests are received at the preferred array, the writes are applied locally first and then applied remotely. However, when write requests are received at the non-preferred array, such writes are applied remotely first and then applied locally. Thus, writes are applied first on the preferred array and then on the non-preferred array, regardless of whether the writes are initially received at the preferred array or the non-preferred array. The improved technique thus ensures that the preferred array always has the most up-to-date data, enabling a clear path to recovery from any out-of-sync conditions that arise and helping to avoid deadlocks.

Certain embodiments are directed to a method of maintaining synchronization between two arrays. The method includes assigning one array of the two arrays to be a preferred array and the other array to be a non-preferred array. The method further includes, in response to receipt of a first write request by the preferred array, writing first data specified by the first write request to the preferred array before writing the first data to the non-preferred array. The method still further includes, in response to receipt of a second write request by the non-preferred array, writing second data specified by the second write request to the preferred array before writing the second data to the non-preferred array, the method thereby writing first to the preferred array regardless of whether data is received by the preferred array or the non-preferred array.

In some examples, the two arrays include a first array and a second array that maintain synchronization for a plurality of data objects, and assigning one array as the preferred array and the other array as the non-preferred array includes: for a first data object of the plurality of data objects, assigning the first array as the preferred array and the second array as the non-preferred array, and for a second data object of the plurality of data objects, assigning the first array as the non-preferred array and the second array as the preferred array.

In some examples, writing the second data specified by the second write request to the preferred array before writing the second data to the non-preferred array includes: opening a transaction by the non-preferred array; while the transaction is open, forwarding the second write request to the preferred array; and in response to the non-preferred array receiving confirmation that the preferred array has written second data, (i) writing the second data at the non-preferred array and (ii) closing the transaction.

In some examples, opening the transaction includes identifying a set of pages in memory of the non-preferred array that are affected by the second write request and locking the identified set of pages. In addition, closing the transaction may include unlocking the identified set of pages.

In some examples, the set of pages includes one or more pages of data and one or more pages of metadata.

In some examples, the method further includes, in response to detecting that the preferred array encounters a locked resource when attempting to write the second data, nullifying the transaction opened by the non-preferred array.

In some examples, writing the first data specified by the first write request to the preferred array before writing the first data to the non-preferred array includes: opening a transaction by the preferred array; while the transaction is open, (i) writing the first data in the preferred array and (ii) forwarding the first write request to the non-preferred array; and in response to the preferred array receiving confirmation that the non-preferred array has written the first data, closing the transaction.

In some examples, the preferred array includes a first processing node and a second processing node, and the method further includes: maintaining, by the preferred array, a pending list of writes performed locally but not yet confirmed to have been written remotely at the non-preferred array; and in response to a failure of the first processing node, accessing, by the second processing node, the pending list and sending the writes identified by the pending list to the non-preferred array.

In some examples, the method further includes detecting, by the non-preferred array, a link failure between the preferred array and the non-preferred array and, in response to detecting the link failure, the non-preferred array discarding reads and/or writes pending on the non-preferred array and disabling further processing by the non-preferred array of I/O requests.

Other embodiments are directed to a computerized apparatus constructed and arranged to perform a method of maintaining synchronization between two arrays, such as the method described above. Still other embodiments are directed to a computer program product. The computer program product stores instructions which, when executed on control circuitry of a computerized apparatus, cause the computerized apparatus to perform a method of maintaining synchronization between two arrays, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for maintaining synchronization between two arrays includes assigning one array to be a preferred array and the other array to be a non-preferred array. When write requests are received at the preferred array, the writes are applied locally first and then applied remotely. However, when write requests are received at the non-preferred array, such writes are applied remotely first and then applied locally. Thus, writes are applied first on the preferred array and then on the non-preferred array, regardless of whether the writes are initially received at the preferred array or the non-preferred array.

Figure 1:
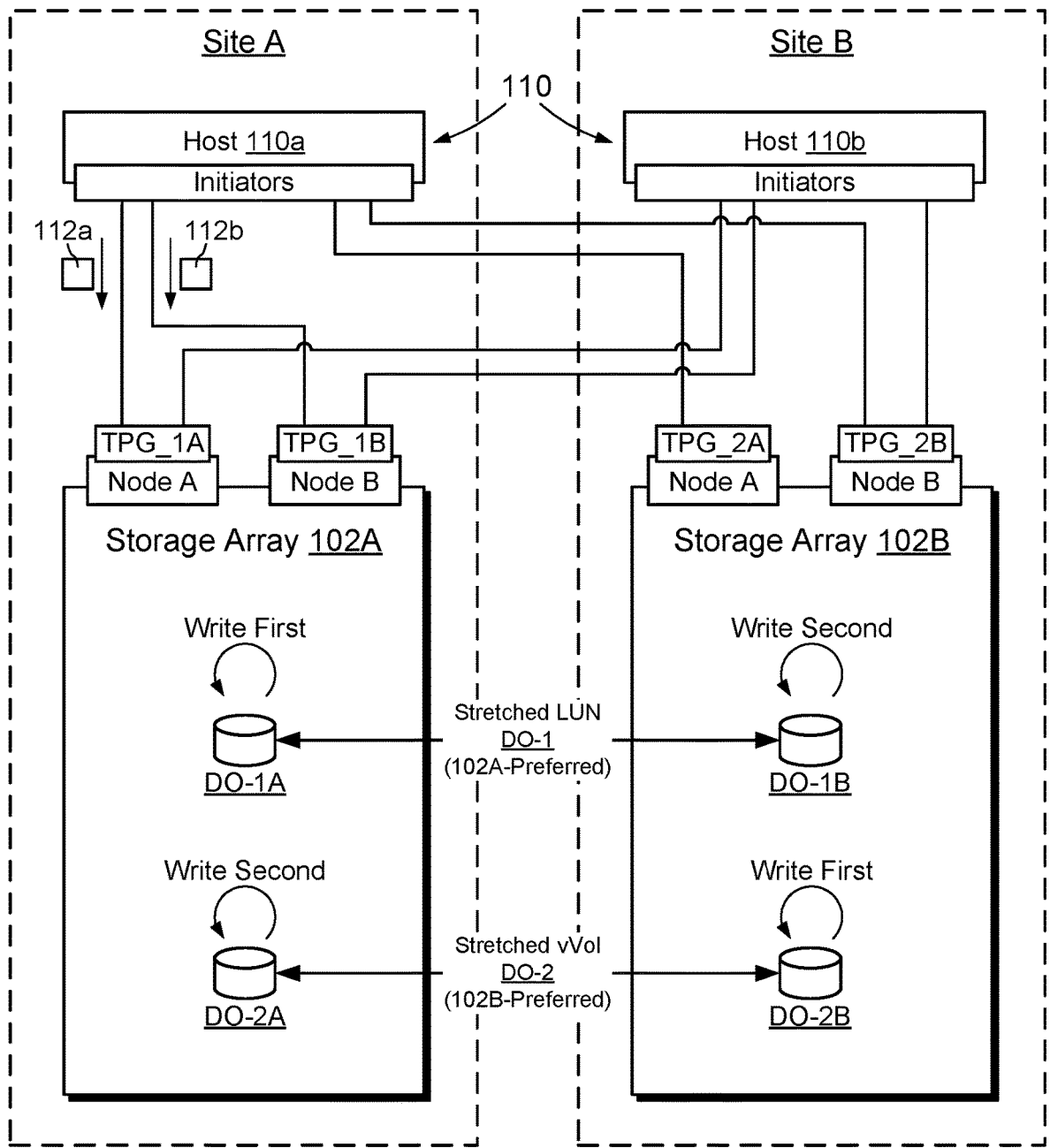
FIG. 1 is a block diagram of an example environment in which embodiments of the improved technique can be practiced.

FIG. 1 shows an example environment 100 in which embodiments of the improved technique can be practiced. Here, a first Array 102A operates at Site A and a second Array 102B operates at Site B. Each array 102 may include one or more storage computing nodes (e.g., Node A and Node B) as well as persistent storage, such as magnetic disk drives, solid state drives, and/or other types of storage drives. Site A and Site B may be located in different data centers, different rooms within a data center, different locations within a single room, different buildings, or the like. Site A and Site B may be geographically separate but are not required to be. Generally, to meet customary metro cluster requirements, Site A and Site B may be separated by no more than 100 km.

Environment 100 further includes hosts 110 (e.g., Host 110a and Host 110b). Hosts 110 run applications that store their data on Array 102A and/or Array 102B. The hosts 110 may connect to arrays 102 via a network (not shown), such as a storage area network (SAN), a local area network (LAN), a wide area network (WAN), the Internet, and/or some other type of network or combination of networks, for example.

Each array 102 is capable of hosting multiple data objects, such as LUNs (Logical UNits), file systems, and virtual volumes (vVols), for example. Some of these hosted data objects may be stretched, meaning that they are deployed in a metro-cluster arrangement in which they are accessible from both Arrays 102A and 102B, e.g., in an Active/Active manner, with their contents maintained in sync. For example, data object DO-1 may be a stretched LUN and data object DO-2 may be a stretched vVol. Environment 100 may present each stretched data object to hosts 110 as a single virtual object, even though the virtual object is maintained internally as a pair of actual objects, with one object of each pair residing on each array. In the example shown, stretched LUN DO-1 resolves to a first LUN DO-1A in Array 102B and a second LUN DO-1B in Array 102B. Likewise, stretched vVol DO-2 resolves to a first vVol DO-2A in Array 102A and a second vVol DO-2B in Array 102B. One should appreciate that each of arrays 102A and 102B may host additional data objects (not shown) which are not deployed in a metro-cluster arrangement and are thus local to each array. Thus, metro-clustering may apply to some data objects in the environment 100 but not necessarily to all.

As further shown, each array 102 may be assigned as a "preferred array" or a "non preferred array." Preference assignments are made by the array 102 and may be automatic or based on input from an administrator, for example. In some examples, array preference is established on a per-data-object basis. Thus, for stretched LUN DO-1, Array 102A may be assigned as the preferred array and Array 102B may be assigned as the non-preferred array. The reverse may be the case for stretched vVol DO-2, where Array 102B may be assigned as preferred and Array 102A as non-preferred.

Assignment of an array as preferred or non-preferred for a particular data object determines how synchronization is carried out across the two arrays for that data object. For example, when a write request to a data object is received (e.g., from one of the hosts 110), the preferred array for that data object is always the first array to persist the data specified by the write request, with the non-preferred array being the second to persist the data. This is the case regardless of whether the preferred array or the non-preferred array is the one to receive the write request from the host. Thus, a first write request received by the preferred array is written first to the preferred array, and also a second write request 112b received by the non-preferred array is written first to the preferred array. This manner of synchronizing data differs from previous schemes, which may always write first locally, always write first remotely, or always write to both sides simultaneously.

As a particular example, assume that Host 110a issues an I/O request 112a specifying a write of host data to LUN DO-1, with Array 102A being the target. Array 102A receives the write request 112a and checks whether it is preferred or non-preferred for the referenced data object, LUN DO-1. In this example, Array 102A is preferred, so Array 102A persists the data first ("Write First"), by writing to DO-1A. Only after such data are persisted on Array 102A does Array 102A replicate the write request 112a to Array 102B, which then proceeds to "Write Second" to DO-1B.

But assume now that Host 110b issues an I/O request 112b specifying a write of host data to vVol DO-2, again with Array 102A being the target. Array 102A receives the write request and checks whether it is preferred or non-preferred for vVol DO-2. In this case, Array 102A is non-preferred, so Array 102A forwards the write request 112b to Array 102B (preferred), which proceeds to "Write First" to DO-2B. Only after Array 102B has persisted this data does Array 102B send control back to Array 102A, which then proceeds to "Write Second" to DO-2A.

Although both of these examples involve Array 102A being the target of the write requests 112a and 112b, similar results follow if Array 102B is the target. For example, if request 112a arrives at Array 102B, Array 102B determines that it is non-preferred for DO-1 and forwards the request 112a to Array 102A, which would then write first to DO-1A. Only then would request 112a return back to Array 102B, which would then write second to DO-1B. As for write request 112b, Array 102B would determine that it is preferred and would write first to vVol DO-2B, and then forward the request 112b to Array 102B, which would write second to vVol DO-2A.

The disclosed write-first preferred technique brings benefits that are not available from previous approaches. As the array preference for any data object is known in advance, it can be assured that the preferred array stores the most up-to-date data. If a link between the arrays fails or the data on the two arrays get out of sync for any reason, it is known that the most recent data can be found on the preferred array. Recovery may then proceed by disabling I/O on the non-preferred array for the affected data object and propagating the most recent data on the preferred array to the non-preferred array.

Figure 2:
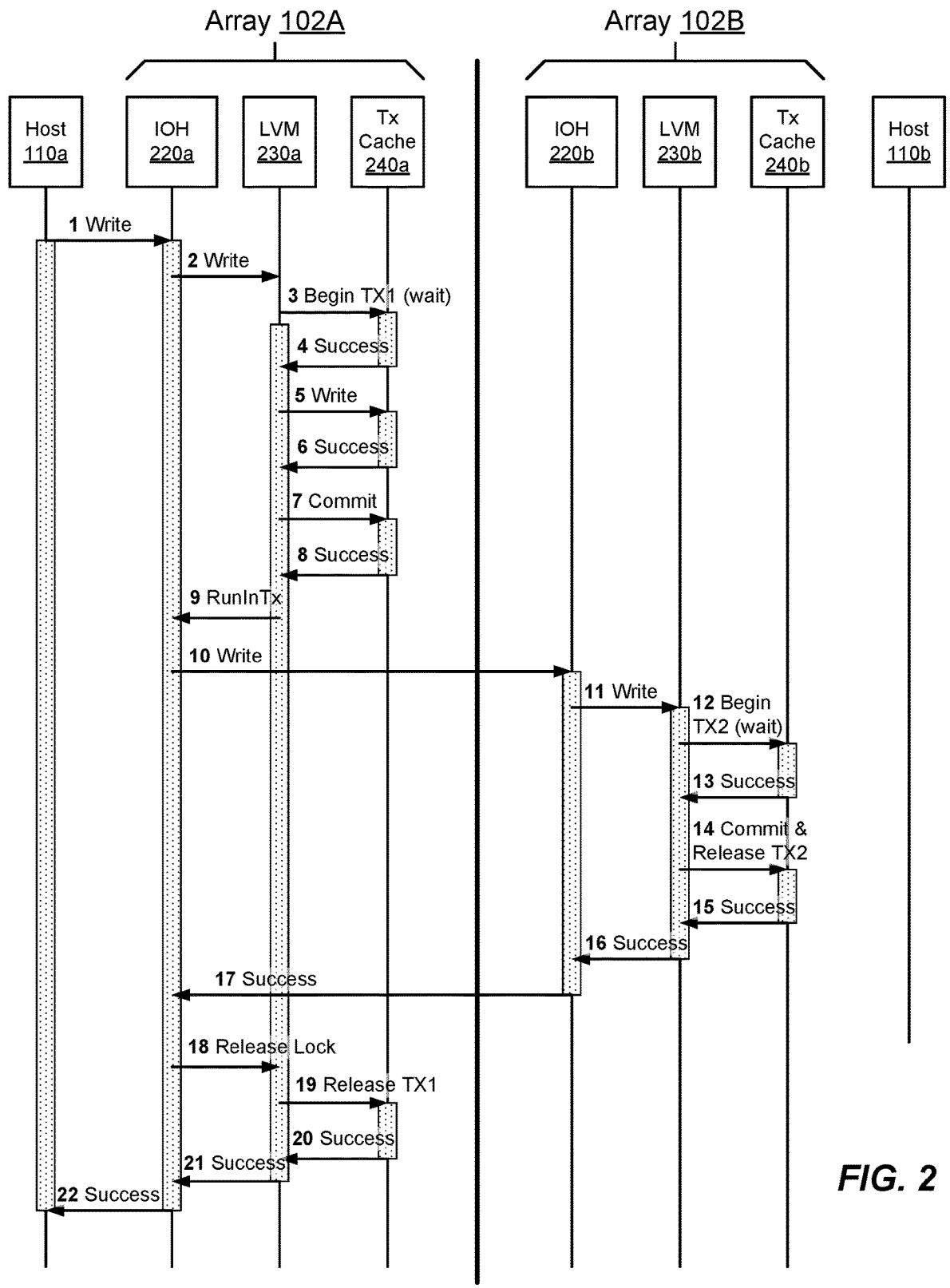
FIG. 2 is a sequence diagram showing an example method of writing when an I/O request is received by a preferred array.

FIG. 2 shows an example sequence of activities for responding to a write request directed to a stretched data object when the target of the write request is the preferred array. The depicted acts involve Host 110a, Host 110b, Array 102A, and Array 102B. By way of example, three components of each array are shown: I/O handler (IOH) 220a, logical volume manager (LVM) 230a, and transaction (Tx) Cache 240a in Array 102A; and IOH 220b, LVM 230b, and Tx Cache 240b in Array 102B. One should appreciate that arrays 102 may vary in their software architectures. Thus, the particular components as shown in each array are intended to be illustrative rather than limiting.

In FIG. 2, bolded numerals indicate an example order of activities. Such numerals will be referenced within this description within parentheses. Also in FIG. 2, shaded bands represent a processing context for a write request issued by Host 110a.

At (1), Host 110a issues a write I/O request to Array 102A, which in this example is the preferred array. At (2), IOH 220a passes the write request to LVM 230a, which responds at (3) by opening a transaction TX1 with Tx cache 240a. It is noted that the instruction at (3) includes an option to "wait" if necessary for any resource conflicts (e.g., locked pages) to clear.

In an example, opening the transaction TX1 at (3) involves identifying all pages of data and metadata that will be affected by fulfilling the write request on Array 102A and taking a lock on each such page. If a page that is to be part of transaction TX1 is not found in Tx Cache 240a, the page may be loaded from disk. The lock may be an exclusive write lock, for example. A "page" in this regard is an addressable unit of memory. Pages may have uniform size, with one suitable page size being 4 kB. Other page sizes may be used. At (4), Tx Cache has successfully opened TX1 and reports the result to LVM 230a.

At (5), LVM 230a configures data and metadata pages as needed for fulfilling the write request in the context of transaction TX1 and issues a write of the configured pages to Tx Cache 240a. In an example, Tx Cache 240a is a persistent cache, such that the write to Tx Cache 240a at (5) persistently stores the configured data and metadata pages involved in TX1. At (6), Tx Cache 240a reports success of the write initiated at (5).

At (7) and (8), LVM 230a commits the TX1 by atomically updating the Tx Cache 240s to formalize the changes written at (5). Although TX1 has been committed, Array 102A nevertheless continues to hold TX1 open and continues to lock the affected pages.

At (9), IOH 220a receives an instruction to replicate the write initiated at (2) to the other (non-preferred) Array 102B and to do so within the context of the still-open transaction TX1 on Array 102A. At this point, synchronization to the non-preferred array begins.

At (10), IOH 220a issues the replicating write to Array 102B. At (11), IOH 220b directs LMV 230b to proceed with the write. At (12), LMV 230b directs Tx Cache 240b to open a new transaction, TX2. As with the transaction TX1 on Array 102A, opening this new transaction TX2 on Array 102B includes identifying and accessing all pages that will be affected by the write. Note that the direction at (12) includes an instruction to "wait" if necessary for any resource conflicts (e.g., locked pages) to clear. Recall that the sequence of FIG. 2 depicts processing of a single write, but arrays 102 typically service many writes in parallel. Thus, it may be necessary at (12) to wait in line before locks can be acquired on all local pages affected by TX2.

Eventually, Tx Cache 240b accesses all necessary pages and returns success at (13). At (14), TX2 is committed in Tx Cache 240b. Also at this point, all locks on local pages affected by TX2 are released. Success of the commit of TX2 is reported back to LVM 230b at (15) and then back to IOH 220b at (16). Success of the overall replication to node 102b is reported back to node 102a at (17).

Upon Array 102A receiving the indication of successful replication to Array 102B at (17), IOH 220a informs LVM 230a of the successful replication at (18), directing LVM 230a to release all locks taken on pages of Array 102A as part of transaction TX1, which was opened at (3) and has remained open the entire time since (3). At (19) transaction TX1 is finally closed, with success reported back in steps to Host 110a at (20), (21), and (22). An example sequence for responding to a host write received by a preferred array has thus been described.

It may be noted that pages, locks, and transactions as described herein are all local to the respective arrays 102 and do not extend across arrays 102. Thus, for example, taking a lock on particular page on Array 102A does not automatically cause a lock to be taken on a corresponding page on Array 102B. Further, each array may be aware of its own transactions but is not automatically aware of transactions opened on the other array. In this sense, the activities at (11)-(16) on Array 102B may proceed with no awareness that they are occurring within the context of a still-open transaction TX1 on Array 102A.

Also, it may be noted that the host write in FIG. 2 is persisted in the preferred array before the write is replicated to the non-preferred array. Also, the host write is persisted on both arrays before success is reported back to the initiating host. Further, the transaction TX1, which is opened by the preferred array prior to persisting the write at the preferred array, is kept open with its associated pages remaining locked until the preferred array receives confirmation that replication to the non-preferred array has succeeded. These features help to avoid many sources of data inconsistency between arrays and also help to avoid deadlocks.

Figure 3:
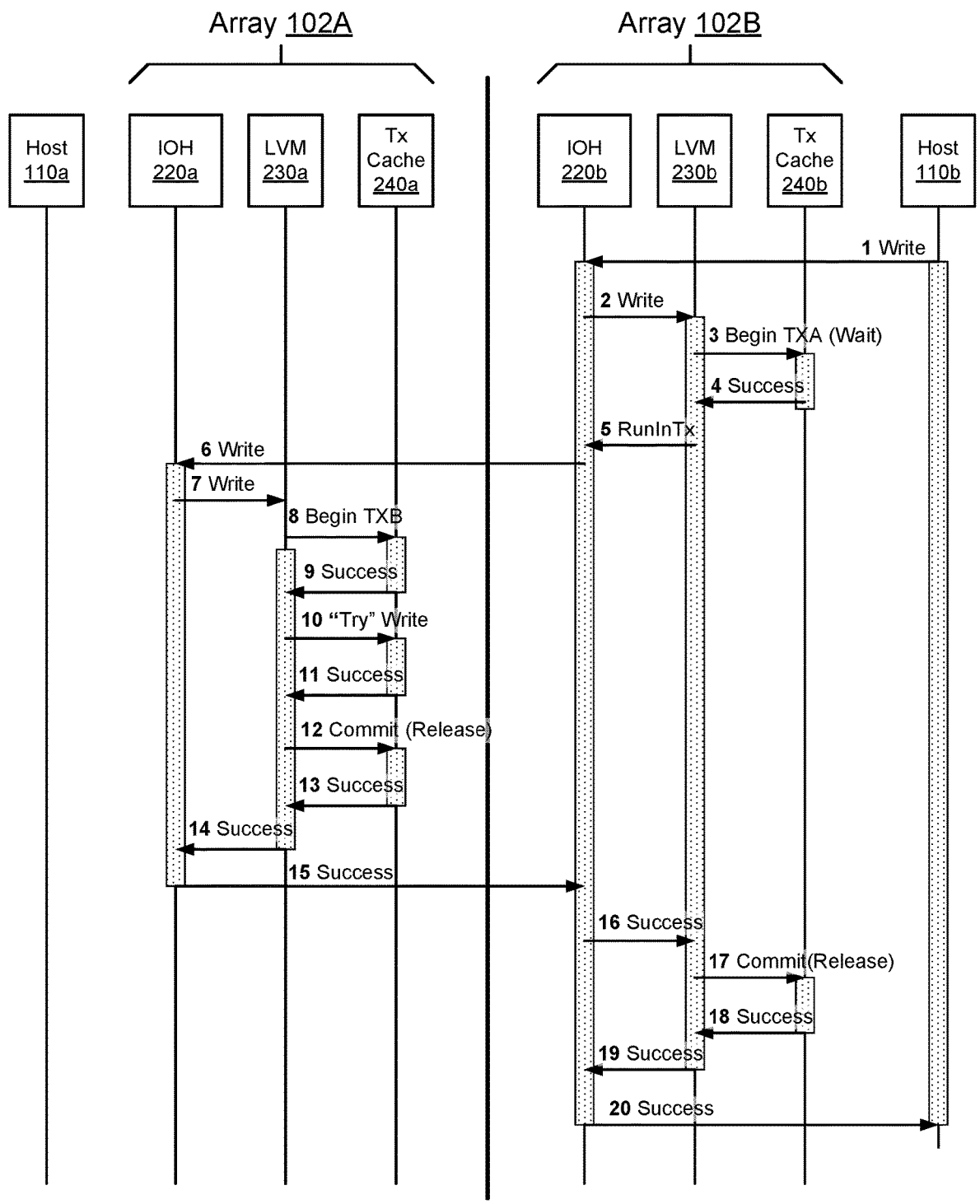
FIG. 3 is a sequence diagram showing an example method of writing when an I/O request is received by a non-preferred array.

FIG. 3 shows an example sequence of activities for responding to a write request directed to a stretched data object when the target of the write request is the non-preferred array. The components shown in FIG. 3 are similar to those shown in FIG. 2, once again with bolded numerals indicating an example order of activities. Also, the shaded bands represent a processing context for a write request, in this case a write request issued by Host 110b.

At (1), Host 110b issues a write request to non-preferred Array 102B. At (2) IOH 220b passes the write request to LVM 230b, and at (3) LVM 230b directs Tx Cache 240b to open a new transaction, TXA. Tx Cache 240b identifies any pages (e.g., pages of data and/or metadata) affected by the write request in Array 102B and attempts to lock such pages, waiting if necessary for any pending locks on such pages to be cleared. Once transaction TXA has been opened and the associated pages have been locked, Tx Cache 240b reports success at (4) to LVM 230b, which at (5) directs IOH 220b to proceed to replicate the write to Array 102A within the context of transaction TXA. Although TXA has been opened at (3), the associated pages have not been committed, thus leaving open the possibility that transaction TXA can be canceled. As in the example of FIG. 2, the transaction opened by the array that receives the write request remains open.

At (6) IOH 220b initiates a replicating write to Array 102A via a command to IOH 220a. At (7), IOH 220a passes the write to LVM 230a. At (8) and (9), Tx Cache 240a opens a new transaction TXB. As part of opening TXB, Tx Cache 240a gathers the pages of data and metadata associated with TXB (i.e., those needed to complete the replicating write on Array 102A), and modifies the pages as needed to accommodate the new data.

At (10), LVM 230a issues a "try" write command, directing the newly gathered pages of TXB to be written to Tx Cache 240a. In contrast with the write at step (5) in FIG. 2, which refers to a "write" but not a "try" write, the write at (10) must be tried as it may be blocked. For example, if another write to the same logical address arrives prior to (6) in the FIG. 3 flow, such that the new write conflicts with the replicating write at (6), then the new write may take priority over the try-write. In such cases, the try-write would fail and the new write would succeed.

Assuming that the try-write at (10) succeeds (e.g., no conflicting writes), then success at (11) prompts the LVM 230a to commit transaction TXB, i.e., the transaction that performs the replicating write. Upon committing TXB, locks on the affected pages are released and success of the replicating write is signaled at (13). Such success propagates, via (14) and (15), back to Array 102B, and via (16), back to LVM 230b. At (17) transaction TXA, which has remained open since (3) is finally written, committed to Tx Cache 240b, and closed, and its locks are released. Tx Cache 240b then signals success at (18), which propagates via (19) and (20) back to Host 110b, which is the host that initiate the write at (1). An example sequence for responding to a host write received by a non-preferred array has thus been described.

The example flows of FIGS. 2 and 3 may cooperate to avoid deadlocks. For instance, consider an example in which a first write arrives at Array 102A (preferred), starting a new FIG. 2 flow and causing a new transaction TX1 to be opened at (2)-(7) of FIG. 2. Assume further that a second write arrives at Array 102B (non-preferred) shortly later, starting a new FIG. 3 flow and causing a new transaction TXA to be opened at (2)-(5) of FIG. 3. Both writes proceed in parallel with no awareness of each other until the second write is replicated to Array 102A and encounters the try-write at (10) of FIG. 3. In this case, the same-page conflict causes the try-write to fail. In an example, the result of such a failure (not shown) may be to completely unwind the second write, canceling transactions TXB and TXA and returning operation all the way back to (3) on Array 102B, which can then try again later to open TXA for processing of the second write received at (1) of FIG. 3. The new write, which blocked the second write at (10), would then be processed normally in accordance with the flow shown in FIG. 2. All processing paths continue and no deadlocks occur.

Note that the second write might have succeeded if it had been issued before the first write. If the second write comes first, the second write starts a new FIG. 3 flow, eventually encountering the try-write at (10). If the first write has not yet opened a new transaction TXA, then the try-write by the second write succeeds, as there is no conflicting write in progress that can block it. The second write thus proceeds normally via the depicted flow of FIG. 3.

Meanwhile, the first write eventually arrives at (3) of the FIG. 2 flow and attempts to open TX1. The attempt initially fails, due to a conflict with the second write, which has locked the page that the first write needs in order to open TX1. But the prescribed "wait" at (3) of FIG. 2 allows the first write to try again. The request at (3) eventually succeeds, once the second write releases the lock on the conflicting page. TX1 is then opened and the first write proceeds, following the normal course of processing depicted in FIG. 2. Once again, no deadlocks occur.

Much attention has been paid to write requests in the examples above. Read requests are much simpler. Assuming that write requests successfully maintain synchronization between pairs of data objects in a metro cluster, reads may be performed from either array, 102A or 102B, as the data on both arrays should be identical. Reads are therefore generally uncomplicated and require no special handling.

Exceptions may arise, however, in the event of data corruption or certain hardware failures. Preferred/non-preferred assignments may be leveraged to address these concerns. For example, based on handling described above for writing to preferred and non-preferred arrays, it can be assumed that the preferred array always has the most up-to-date version of any page in a synchronized data object. In the event of any conflict between same-page contents, the preferred array is presumed to be correct. If a network link that connects the two arrays is lost or compromised, the non-preferred array can detect this loss and immediately discard any pending I/O requests (both reads and writes) in flight and stop servicing I/O requests (i.e., for those objects for which the array is non-preferred). When the non-preferred array comes back online, it may resynchronize with the preferred array, e.g., by receiving any writes persisted on the preferred array but not yet mirrored to the non-preferred array.

In some examples, the preferred array maintains regular communication with the non-preferred array, and the non-preferred array is configured to go offline (from the I/O perspective) if it does not receive a communication from the preferred array within some predetermined time interval. More particularly, the preferred array may issue the non-preferred array a license specifying a time-to-live (TTL). The non-preferred array counts down from the TTL to zero. If it does not receive a new license before the TTL expires, the non-preferred array automatically takes itself offline (again, for purposes of I/O requests directed to objects for which it is non-preferred).

Figure 4:
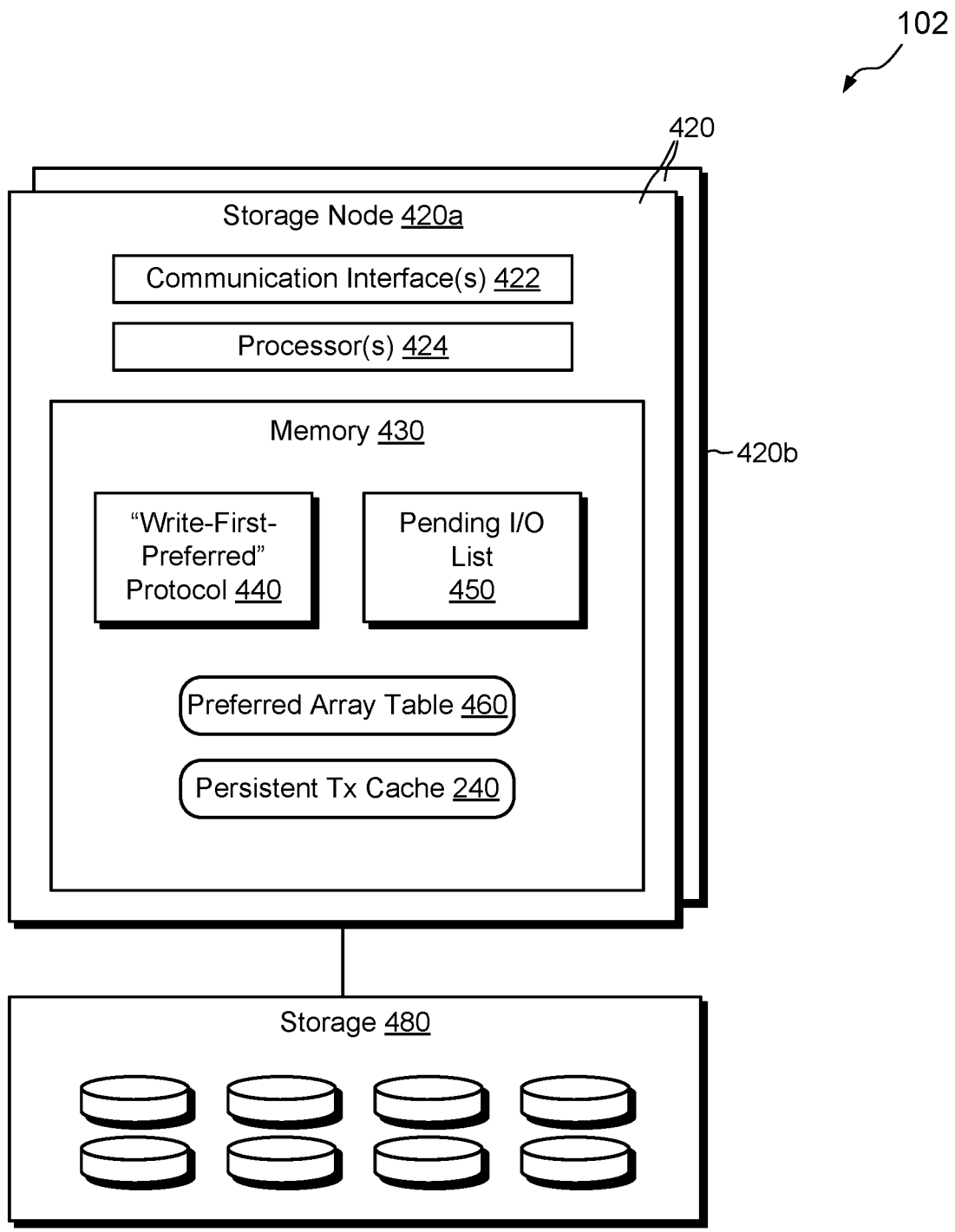
FIG. 4 is a block diagram of an example array.

FIG. 4 shows an example arrangement of a storage array 102 in greater detail. Array 102 may be representative of Array 102A and Array 102B; however, there is no requirement that the two arrays 102A and 102B be identical.

Array 102 is seen to include a pair of storage nodes 420 (i.e., 420a and 420b; also called storage processors, or "SPs"), as well as storage 480, such as magnetic disk drives, electronic flash drives, and/or the like. Nodes 420 may be provided as circuit board assemblies or blades, which plug into a chassis that encloses and cools the nodes 420. The chassis has a backplane or midplane for interconnecting the nodes, and additional connections may be made among nodes using cables. In some examples, nodes 420 are part of a storage cluster, such as one which contains any number of storage appliances, where each appliance includes a pair of nodes 420 connected to shared storage devices. No particular hardware configuration is required, however.

As shown, node 420a includes one or more communication interfaces 422, a set of processors 424, and memory 430. The communication interfaces 422 include, for example, SCSI target adapters and/or network interface adapters for converting electronic and/or optical signals received over a network to electronic form for use by the node 420a. They may further include, in some examples, NVMe-oF (Nonvolatile Memory Express over Fabrics) ports. The set of processors 424 includes one or more processing chips and/or assemblies, such as numerous multi-core CPUs (central processing units). The memory 430 includes both volatile memory, e.g., RAM (Random Access Memory), and non-volatile memory, such as one or more ROMs (Read-Only Memories), disk drives, solid state drives, and the like. The set of processors 424 and the memory 430 together form control circuitry, which is constructed and arranged to carry out various methods and functions as described herein. Also, the memory 430 includes a variety of software constructs realized in the form of executable instructions. When the executable instructions are run by the set of processors 424, the set of processors 424 is made to carry out the operations of the software constructs. Although certain software constructs are specifically shown and described, it is understood that the memory 430 typically includes many other software components, which are not shown, such as an operating system, various applications, processes, and daemons.

As further shown in FIG. 4, the memory 430 "includes," i.e., realizes by execution of software instructions, a write-first-preferred protocol 440, a pending I/O list 450, a preferred array table 460, and persistent transaction cache 440. The write-first-preferred protocol 440 is a software component that implements the process flows shown in FIGS. 2 and 3, which help to avoid deadlocks and to maintain synchronization across data objects configured in a metro-cluster arrangement, e.g., by supporting reliable replication between arrays.

Pending I/O list 450 may contain a list of I/O's in flight on node 420a. These may include write requests persisted on the local array but not yet confirmed to be replicated to the remote array. Pending I/O list 450 may thus be useful in recovering from failures of node 420a, such as a power failure or system panic. In an example, pending I/O list 450 is available to both nodes 420 in the local array 102. For example, I/O list 450 may be stored in a shared memory area or in persistent storage separate from both nodes 420. In response to a failure of node 420a, for example, node 420b can access the pending I/O list 450. Node 420b can determine whether there are any pending writes for which the local array is preferred and send those writes to the non-preferred array.

Preferred array table 460 is a data structure that associates data objects hosted by the local array with corresponding preferred arrays and, in some cases corresponding non-preferred arrays (e.g., if not implied). Contents of the preferred array table 460 may be established by the node 120a based on input from a system administrator or automatically, e.g., based on any desired criteria, such as load distribution, location of arrays and/or hosts, network topology, and the like. Preferred array table 460 may also be stored in shared memory, or in persistent memory accessible to both nodes 120. Alternatively, it may be stored locally in each node and mirrored to the other. In some examples, preferred array table 460 is replicated across arrays, such that both the preferred array and the non-preferred array have the same table of assignments.

Persistent Tx Cache 240 corresponds to Tx Cache 240a or Tx Cache 240b (FIGS. 2 and 3). Tx Cache 240 is preferably implemented in high-speed non-volatile memory, such as flash storage, which may include NVMe-based flash storage. It may also have a volatile memory component. For example, a mirror may be established between volatile memory (e.g., DRAM) that runs on each of nodes 420 and NVMe-based flash storage that is separate from the nodes 420. Tx Cache 240 may be configured to store both data and metadata. In some examples, Tx Cache 240 performs the role of quickly receiving incoming writes and persisting their data until near-real-time processes can destage from the Tx Cache 240 to longer-term non-volatile structures, such as disk drives and the like found in storage 480.

Figure 5:
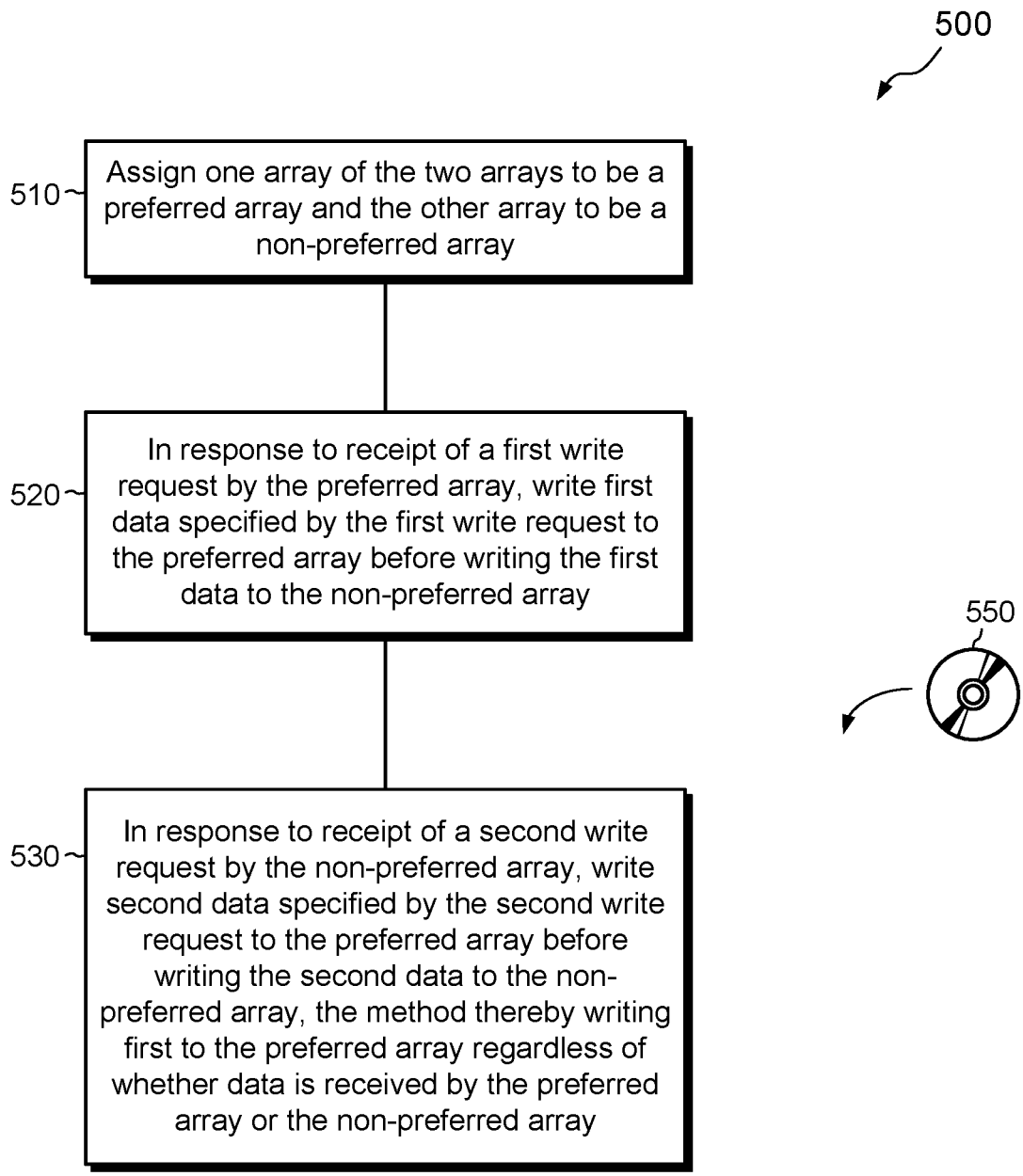
FIG. 5 is a flowchart showing an example method of maintaining synchronization between two arrays.

FIG. 5 shows an example method 500 of maintaining synchronization between two arrays and provides a review of certain features described above. Method 500 may be carried out in connection with the environment 100 and is typically performed, for example, by the software constructs described in connection with FIGS. 1 and 4, which reside in the memory 430 of one or more processing nodes 420 and are run by one or more sets of processors 424. The various acts of method 500 may be ordered in any suitable way. Accordingly, embodiments may be constructed in which acts are performed in orders different from that illustrated, which may include performing some acts simultaneously.

At 510, one of the arrays (e.g., Array 102A) is assigned to be a preferred array and the other (e.g., Array 102B) is assigned to be a non-preferred array. For example, assignments may be based on input from an administrator or they may be made automatically.

At 520, in response to receipt of a first write request (e.g., 112a) by the preferred array, the method includes writing first data specified by the first write request 112a to the preferred array before writing the first data to the non-preferred array. An example of this kind of response to a write request received by a preferred array is shown in FIG. 2.

At 530, in response to receipt of a second write request by the non-preferred array, writing second data specified by the second write request to the preferred array before writing the second data to the non-preferred array. An example of this kind of response to a write request received by a non-preferred array is shown in FIG. 3.

The method 500 thereby writes first to the preferred array regardless of whether data is received by the preferred array or the non-preferred array.

An improved technique has been described for maintaining synchronization between two arrays 102. The technique includes assigning one array (e.g., 102A) to be a preferred array and the other array (e.g., 102B) to be a non-preferred array. When write requests 112a are received at the preferred Array 102A, the writes are applied locally first and then applied remotely. However, when write requests 112b are received at the non-preferred Array 102B, such writes are applied remotely first and then applied locally. Thus, writes are applied first on the preferred array and then on the non-preferred array, regardless of whether the writes are initially received at the preferred array or the non-preferred array. The improved technique thus ensures that the preferred array always has the most up-to-date data, enabling a clear path to recovery from any out-of-sync conditions that arise and helping to avoid deadlocks.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of maintaining synchronization between two arrays, comprising:
    assigning one array of the two arrays to be a preferred array and the other array to be a non-preferred array;
    in response to receipt of a first write request by the preferred array, writing first data specified by the first write request to the preferred array before writing the first data to the non-preferred array; and
    in response to receipt of a second write request by the non-preferred array, writing second data specified by the second write request to the preferred array before writing the second data to the non-preferred array, the method thereby writing first to the preferred array regardless of whether data is received by the preferred array or the non-preferred array,
    wherein writing the second data specified by the second write request to the preferred array before writing the second data to the non-preferred array includes:
    opening a transaction by the non-preferred array;
    while the transaction is open, forwarding the second write request to the preferred array; and
    in response to the non-preferred array receiving confirmation that the preferred array has written second data, (i) writing the second data at the non-preferred array and (ii) closing the transaction.

2. The method of claim 1, wherein the two arrays include a first array and a second array that maintain synchronization for a plurality of data objects, and wherein assigning one array as the preferred array and the other array as the non-preferred array includes:
    for a first data object of the plurality of data objects, assigning the first array as the preferred array and the second array as the non-preferred array, and
    for a second data object of the plurality of data objects, assigning the first array as the non-preferred array and the second array as the preferred array.

3. The method of claim 1, wherein opening the transaction includes identifying a set of pages in memory of the non-preferred array that are affected by the second write request and locking the identified set of pages, and wherein closing the transaction includes unlocking the identified set of pages.

4. The method of claim 3, wherein the set of pages includes one or more pages of data and one or more pages of metadata.

5. The method of claim 1, further comprising, in response to detecting that the preferred array encounters a locked resource when attempting to write the second data, nullifying the transaction opened by the non-preferred array.

6. The method of claim 1, wherein writing the first data specified by the first write request to the preferred array before writing the first data to the non-preferred array includes:
locking a set of pages affected by the first write;
opening a transaction by the preferred array;
while the transaction is open, (i) writing the first data in the preferred array and (ii) forwarding the first write request to the non-preferred array; and
in response to the preferred array receiving confirmation that the non-preferred array has written the first data, closing the transaction.

7. The method of claim 1, wherein the preferred array includes a first processing node and a second processing node, and wherein the method further comprises:
maintaining, by the preferred array, a pending list of writes performed locally but not yet confirmed to have been written remotely at the non-preferred array; and
in response to a failure of the first processing node, accessing, by the second processing node, the pending list and sending the writes identified by the pending list to the non-preferred array.

8. The method of claim 1, further comprising:
detecting, by the non-preferred array, a link failure between the preferred array and the non-preferred array; and
in response to detecting the link failure, the non-preferred array discarding reads and/or writes pending on the non-preferred array and disabling further processing by the non-preferred array of I/O requests.

9. The method of claim 1, wherein the transaction is local to the non-preferred array and does not extend to the preferred array, such that the preferred array has no awareness of the transaction.

10. The method of claim 9, wherein opening the transaction includes identifying a set of pages in memory of the non-preferred array that are affected by the second write request and obtaining locks on the identified set of pages, the locks being local to the non-preferred array and not extending to the preferred array.

11. A computerized apparatus, comprising control circuitry that includes a set of processing units coupled to memory, the control circuitry constructed and arranged to:
assign one array of the to be a preferred array and another array to be a non-preferred array;
in response to receipt of a first write request by the preferred array, write first data specified by the first write request to the preferred array before writing the first data to the non-preferred array; and
in response to receipt of a second write request by the non-preferred array, write second data specified by the second write request to the preferred array before writing the second data to the non-preferred array,
wherein the control circuitry constructed and arranged to write the second data specified by the second write request to the preferred array before writing the second data to the non-preferred array is further constructed and arranged to:
open a transaction by the non-preferred array;
while the transaction is open, forward the second write request to the preferred array; and
in response to the non-preferred array receiving confirmation that the preferred array has written second data, (i) write the second data at the non-preferred array and (ii) close the transaction.

12. A computer program product including a set of non-transitory, computer-readable media having instructions which, when executed by control circuitry of a computerized apparatus, cause the computerized apparatus to perform a method of maintaining synchronization between two arrays, the method comprising:
assigning one array of the two arrays to be a preferred array and the other array to be a non-preferred array;
in response to receipt of a first write request by the preferred array, writing first data specified by the first write request to the preferred array before writing the first data to the non-preferred array; and
in response to receipt of a second write request by the non-preferred array, writing second data specified by the second write request to the preferred array before writing the second data to the non-preferred array, the method thereby writing first to the preferred array regardless of whether data is received by the preferred array or the non-preferred array,
wherein writing the first data specified by the first write request to the preferred array before writing the first data to the non-preferred array includes:
opening a transaction by the preferred array;
while the transaction is open, (i) writing the first data in the preferred array and (ii) forwarding the first write request to the non-preferred array; and
in response to the preferred array receiving confirmation that the non-preferred array has written the first data, closing the transaction.

13. The computer program product of claim 12, wherein the two arrays include a first array and a second array that maintain synchronization for a plurality of data objects, and wherein assigning one array as the preferred array and the other array as the non-preferred array includes:
for a first data object of the plurality of data objects, assigning the first array as the preferred array and the second array as the non-preferred array, and
for a second data object of the plurality of data objects, assigning the first array as the non-preferred array and the second array as the preferred array.

14. The computer program product of claim 12, wherein writing the second data specified by the second write request to the preferred array before writing the second data to the non-preferred array includes:
opening a transaction by the non-preferred array;
while the transaction is open, forwarding the second write request to the preferred array; and
in response to the non-preferred array receiving confirmation that the preferred array has written second data, (i) writing the second data at the non-preferred array and (ii) closing the transaction.

15. The computer program product of claim 14, wherein opening the transaction includes identifying a set of pages in memory of the non-preferred array that are affected by the second write request and locking the identified set of pages, and wherein closing the transaction includes unlocking the identified set of pages.

16. The method of claim 15, wherein the set of pages includes one or more pages of data and one or more pages of metadata.

17. The computer program product of claim 14, wherein the method further comprises, in response to detecting that the preferred array encounters a locked resource when attempting to write the second data, nullifying the transaction opened by the non-preferred array.

18. The computer program product of claim 12, wherein the preferred array includes a first processing node and a second processing node, and wherein the method further comprises:
   maintaining, by the preferred array, a pending list of writes performed locally but not yet confirmed to have been written remotely at the non-preferred array; and
   in response to a failure of the first processing node, accessing, by the second processing node, the pending list and sending the writes identified by the pending list to the non-preferred array.

19. The computer program product of claim 12, wherein the method further comprises:
   detecting, by the non-preferred array, a link failure between the preferred array and the non-preferred array; and
   in response to detecting the link failure, the non-preferred array discarding reads and/or writes pending on the non-preferred array and disabling further processing by the non-preferred array of I/O requests.

20. The computer program product of claim 12, wherein assigning one array of the two arrays to be a preferred array and the other array to be a non-preferred array is performed automatically.

* * * * *